Jan. 31, 1967          G. A. DOTTO          3,302,045

VIBRATOR MOTOR WITH STEPPED ROTARY OUTPUT

Filed June 15, 1964          4 Sheets-Sheet 1

INVENTOR.
GIANNI A. DOTTO
BY
ATTORNEY

INVENTOR.
GIANNI A. DOTTO
ATTORNEY

INVENTOR
GIANNI A. DOTTO
BY Robert Levine
ATTORNEY

United States Patent Office 3,302,045
Patented Jan. 31, 1967

3,302,045
VIBRATOR MOTOR WITH STEPPED
ROTARY OUTPUT
Gianni A. Dotto, Dayton, Ohio, assignor to P. R. Mallory & Co., Inc., Indianapolis, Ind., a corporation of Delaware
Filed June 15, 1964, Ser. No. 375,117
16 Claims. (Cl. 310—37)

The present invention relates to low wattage prime movers, more particularly to a low wattage, slow speed electric motor comprising a vibrating armature and a plurality cooperating one-way clutches which combination converts an electrical energy input into unidirectional, rotational mechanical movement output. The low wattage prime mover of the present invention is employed to provide a torque output which is twenty to thirty times greater than the torque output of a conventional synchronous motor of the same physical dimensions. The torque so produced at slow speed can be utilized to actuate control devices such as a periodic switch means that in turn regulates the time sequence of operations in a washing machine and other similar devices without the use of an intermediate speed reduction system utilized with the conventional synchronous motor timer control system.

In a device of this general nature it is desirable that the prime mover comprise a small electrical motor that has the characteristics of a high torque for its size and of a slow speed rotational output. The motor rotates its rotatable shaft in a predetermined direction at a predetermined slow speed. The rotatable shaft of the motor initiates operation of an associated time control device such as a switch means having as a component thereof a series of cams and cam actuated switches which switches periodically activate electrical circuitry. The low wattage prime mover would necessarily incorporate therein an electrical input means, a coil, a plurality of permanent magnets, a vibrating armature, a plurality of one-way clutches, and a rotatable shaft coupled to a switch means that sequentially actuates a plurality of electrical circuits.

Several prime movers presently available are utilized to transform an electrical energy input into a rotary movement output and are used in conjunction with a switch means to comprise a control timer. However, these several prime movers are of the synchronous motor type that utilize a complicated and expensive gear reduction system to reduce the high rotational speed of the shaft of the conventional synchronous motor to a slow rotational speed, and utilize a large and bulky coil and armature to achieve the desired torque output.

In contrast to the bulky synchronous motors and the associated complicated and expensive gear reduction systems, the present invention provides a prime mover means whereby the permanent magnet synchronous motor and gear reduction system is replaced by a coil, vibratory armatures, an associated plurality of one-way clutches and a rotatable shaft. The invention comprises efficient, inexpensive, accurate, effective and compact low wattage motor that includes a shaft rotated unidirectionally at a slow speed without the use of reduction gears or the like yet having high torque output. The slow moving shaft having high torque provides a driving force that actuates a cam operated means that in turn controls the sequential operation of a plurality of switch means of a control timer.

In addition, the present invention provides a novel one-way clutch that is capable of locking and releasing a rotatable shaft within four minutes of a degree by utilizing a novel seat configuration for a plurality of roller bearings in cooperative relationship with substantially V-shaped springs that have a crotch portion that is substantially three-quarter circular shaped. Several clutches presently available are not capable of locking and thereafter releasing a shaft within four minutes of a degree, but rather such clutches lock and thereafter release a shaft within a degree or more. The inability of these several clutches to lock and subsequently release within several minutes of a degree would introduce appreciable error into time control devices if used with time control devices.

The novel one-way clutch utilizes an odd number of bearings arranged in such a manner about the outer periphery of a shaft so that the center of one ball bearing does not pass through the center of any other ball bearing that constitutes the one-way clutch. If more than one bearing lies in the aforesaid plane, it was found that not only were the bearings subjected to excessive wear which subsequently reduced the effective life of the bearings, but also the shaft about which said bearings lie was subjected to oscillations about its longitudinal axis which oscillations effected the accuracy of movement of the shaft. It is seen such oscillation would introduce error into a timer control that cannot be tolerated if accurate operating results are to be achieved. It was found that by utilizing an odd number of bearings and equally spacing each bearing from its sister bearing about the outer periphery of the rotatable shaft such that the plane passing through the longitudinal axis of the shaft and the center of a ball bearing does not pass through the center of any other bearing, the clutch was rendered self-centering with respect to the shaft thus eliminating deleterious oscillations of the shaft. In addition, it was found that bearing wear was substantially reduced by utilizing an odd number of bearings about the periphery of said shaft.

It is an object of the present invention to provide a novel translating means utilized to transform electrical energy into a slow moving, high torque mechanical movement.

Still another object of the present invention is to provide a prime mover that is simple to fabricate and assemble having constant speed and constant torque characteristics.

A further object of the present invention is to provide a vibrator motor that has a mechanical output that is more positive in action than permanent magnet synchronous electric motors.

Still another object of the present invention is to provide an electric motor means for actuating a plurality of multi-contact electric switches, said electric motor being inexpensive and accurate in construction.

A further object of the present invention is to provide a quiet low wattage prime mover having a shaft that is unidirectionally rotated at a variable slow speed.

Still a further object of the present invention is to provide a quiet slow speed electric motor used in conjunction with timing devices wherein a shaft is unidirectionally rotated by a means comprising a vibrating armature of variable length and a plurality of novel one-way clutches.

A further object of the present invention is to provide a slow speed electric motor including a simple and effective means for regulating the output speed of an associated shaft.

Still another object of the present invention is to provide a small vibrator electric motor that has an associated shaft wherein the speed of said shaft is low and the torque of said shaft is high.

A further object of the present invention is to provide a one-way clutch assembly wherein the clutch is overrunning when rotated in a first direction with respect to a shaft and engaging with the shaft when rotated in a second direction.

The present invention in another of its aspects relates to novel features of the instrumentalities of the invention described therein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description, appended claims, and appended drawings. The invention resides in the novel construction, combination, arrangement and cooperation of elements as hereinafter described and more particularly as defined in the appended claims.

The appended drawings illustrate several novel and different embodiments of the present invention and constructed to function in the most advantageous modes devised for the practical application of the basic principles involved in the hereinafter described invention.

Figure 1:
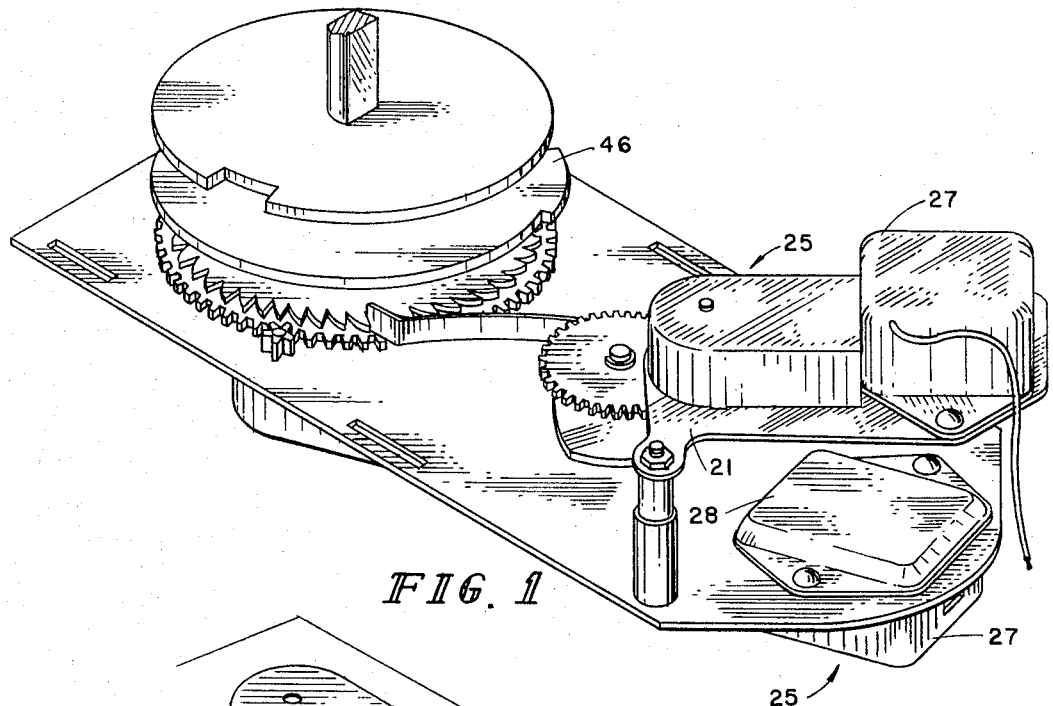
FIGURE 1 is a perspective view of the present invention illustrating the electric motor and associated cam means.

Generally speaking, the invention comprises a means and method for providing a slow speed electric motor. The slow speed electric motor of the present invention includes a coil energized by a pulsating current such as alternating current to develop a pulsating magnetic flux. Permanent magnets are positioned adjacent the extremities of the coil, and the magnets develop a steady magnetic flux. An armature fabricated of silicon steel is placed with respect to the coil so that the armature provides a pulsating magnetic flux flow path for the flux developed by the coil. The interaction between the pulsating magnetic flux of the coil and the steady magnetic flux of the permanent magnets causes the armature to oscillate about a pivot point. A one-way clutch is coupled to an extremity of the armature. A shaft is coupled to the one-way clutch in such a manner that the shaft serves as the pivot point for the oscillating armature. The one-way clutch translates the oscillatory motion of the armature to unidirectional motion, which motion rotates the shaft in a predetermined direction.

More particularly, the coil includes for applying a pulsating current thereto an apertured longitudinal axis. An apertured permanent magnet is positioned at each extremity of the apertured axis of the coil such that the aperture of each permanent magnet corresponds to the aperture of the coil. An armature capable of oscillating about a shaft is positioned with the combined apertures of the coil and the permanent magnets. The armature is coupled to the shaft through a one-way clutch. The armature defines a path for the pulsating magnetic flux developed by the coil. The permanent magnets develop a steady magnetic flux. The armature oscillates within the combinated aperture as a result of the interaction between the pulsating magnetic flux and the steady magnetic flux of the permanent magnets. The one-way clutch coupled between the armature and the shaft translates the oscillatory motion of the armature into unidirectional motion which unidirectional motion rotates the shaft in a predetermined direction.

Another embodiment of the present invention is a constant low speed and high torque vibratory motor. A coil has electrical connections to which pulsating current such as alternating current is applied. The coil develops a pulsating magnetic flux as a result of the pulsating current. The coil is apertured at its longitudinal axis. An apertured permanent magnet is positioned at each extremity of the apertured coil so that the aperture of the permanent magnet corresponds to the aperture of the coil. At least two armatures are predeterminately positioned within the combined longitudinal aperture of the coil and permanent magnets. Each of the armatures is coupled to a shaft through a one-way clutch such that the shaft defines an axis about which each armature oscillates. Each of the armatures defines a path for the pulsating magnetic flux flow of the coil. Each of the apertured permanent magnets includes a steady magnetic flux. The armature oscillates within the aperture as a result of the interaction of the pulsating magnetic flux flow in the armature and the steady magnetic flux flow developed by each permanent magnet. One of the armatures is displaced initially in a first direction and thereafter displaced in a second direction, the direction of travel of the armature reversing periodically such that the armature oscillates. Another of the armatures or second armature is displaced initially in a second direction and thereafter the second armature is displaced in a first direction such that the second armature oscillates. The one-way clutch is coupled to each of the armatures to translate the oscillatory motion of each armature into constant, unidirectional motion, which motion rotates a shaft in a predetermined direction at a constant speed.

The one-way clutch of the present invention includes an odd number of bearings so that the clutch is self-centering with respect to the shaft. A minimum of three roller bearings are used. A resilient spring is associated with each of the roller bearings to urge the bearings to a predetermined position such that the bearings are required to travel four minutes or less to either lock with the shaft or disengage with the shaft such that the shaft is free running.

Figure 2:
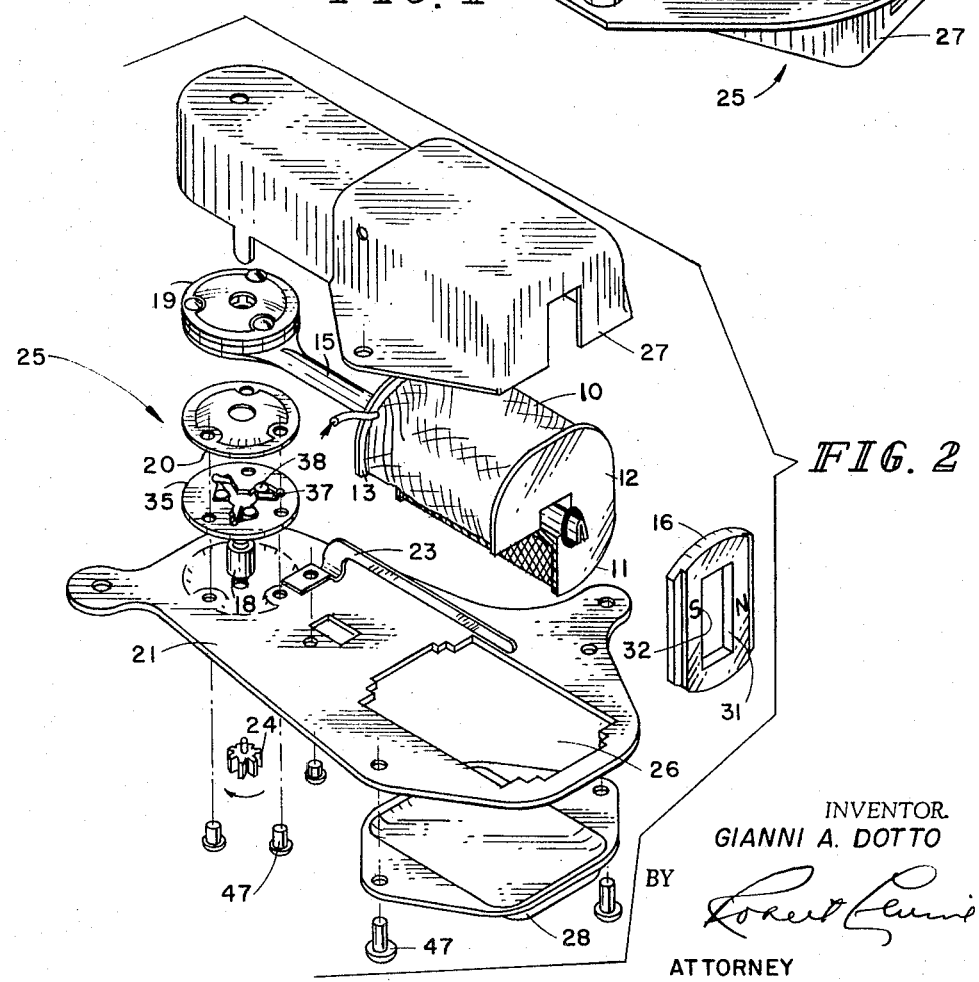
FIGURE 2 is a perspective view of the present invention illustrating in detail the slow speed electric motor.

Referring now to FIGURES 1–4 of the drawings which illustrates the preferred embodiment of the present invention comprising a motor 25, a coil 10 is wound about spindle 11 fabricated of plastic or other suitable material. Spindle 11 has a first flange 12 at one extremity thereof and at a right angle thereto and a second flange 13 at a second extremity of the spindle and at a right angle thereto. The spindle and associated flanges serve to predeterminately seat and locate the coil. An aperture 14 traverses longitudinally the axis of spindle 11. Aperture 14 projects through flange 12 and flange 13 and the aperture is of sufficient dimension to accommodate armature 15 and predetermined oscillatory displacement of the armature in a particular plane. Armature 15 extends the entire length of aperture 14 and projects beyond flange 12 and flange 13 predetermined distances. A first rectangular shaped permanent magnet 16 is placed juxtaposition first flange 12 and is affixed thereto by any suitable holding means. A rectangular shaped second permanent magnet 17 is placed juxtaposition second flange 13 and is affixed thereto by any suitable retaining means. As shown in FIGURE 2 aperture 14 extends through magnet 16 and magnet 17. A first pole of each magnet is marked "N" to denote the north pole of each respective magnet and a second pole is marked "S" to denote the south pole of each respective magnet. Each magnet develops a steady magnet flux.

Figure 3:
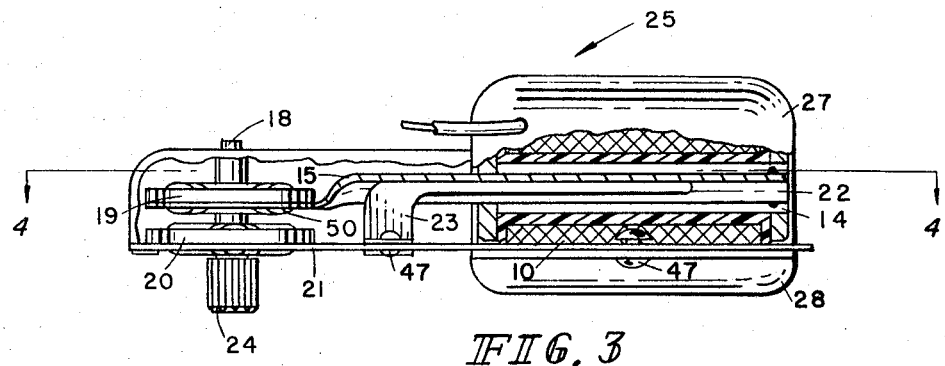
FIGURE 3 is a fragmentary cross sectional view of the slow speed electric motor.
Figure 4:
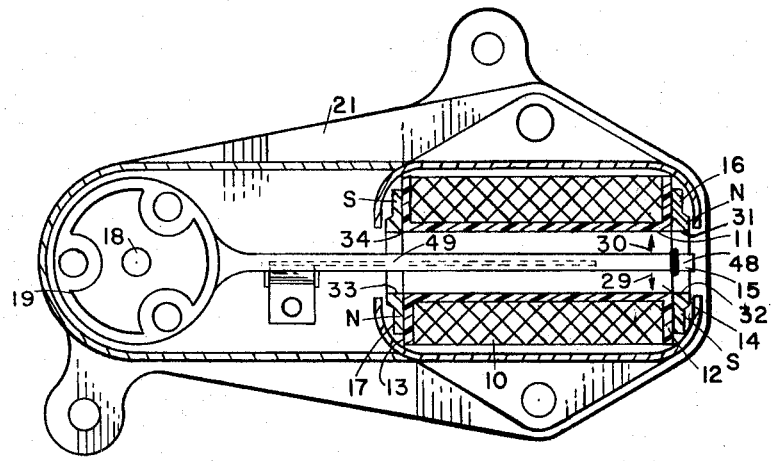
FIGURE 4 is a vertical view taken across the line 4—4 of FIGURE 3 of the slow speed electric motor.

Armature 15 extends the entire length of aperture 14 as shown by FIGURES 3 and 4 and thereafter projects beyond the permanent magnets predetermined distances. One extremity of armature 15 is coupled to a pivot point about which the armature oscillates. The point about which armature 15 oscillates is the longitudinal axis of shaft 18. The armature is coupled to shaft 18 by means of one-way clutch 19. Shaft 18 is supported in a predetermined position by means of first one-way clutch 19 and second one-way clutch 20. One-way clutch 20 is securely coupled to mounting frame 21.

Armature 15 incorporates therein a slot 22 that extends the length of the armature in such a manner that said slot interfits with leaf spring 23 fabricated from any suitable resilient materials such as metal or plastic. The leaf spring is L-shaped and has an extremity that is securely coupled to mounting frame 21 by any suitable means such as rivet 47. Spring 23 biases the armature to a predetermined initial and terminal position within coil 10. Predeterminately positioning the armature within aperture 14 prevents subsequent magnetization of said armature by either permanent magnet 12 or permanent magnet 13 and prevents lag in actuation of said armature. The resultant lag depends on the polarity of the initial half cycle of alternating current that is applied to coil 10 and against which pole face of the permanent magnet the armature was positioned. It is seen that if armature 15 subsequently became magnetized, such magnetization would have a deleterious effect on the operation of vibratory motor 25.

Shaft 18 has coupled to one extremity thereof pinion 24. Shaft 18 is retained in a predetermined perpendicular position with respect to coil 10 and armature 15 by one-way clutch 20 securely fixed to mounting frame 21. Mounting frame 21 has an aperture 26 in which the combination of coil 10 and associated flanges 12 and 13 and associated permanent magnets 16 and 17 interfit to provide a secure seat for the combination. Aperture 26 interfitting with coil 10 in the horizontal plane prevents displacement of the coil in the horizontal direction. A cover 27 substantially interfitting with motor 25 in three planes encloses the motor in those three planes. Cover 27 is fixedly coupled to mounting frame 21 by a plurality of appropriate securing means such as rivets 47. Covers 27 and 28 are utilized to prevent vertical displacement of the coil and to afford the coil protection from abusive handling.

It is seen that an alternating electrical current passing through coil 10 and about armature 15 causes an alternating or pulsating magnetic flux to flow through a path defined by the armature. The magnetic flux causes a first polarity to exist in a first extremity of the armature and a second polarity to exist in the second extremity of the armature. The polarities that exist in the two extremities of the armature interacting with the polarities of the pole faces of the permanent magnets causes the armature to move in a first or second horizontal direction as illustrated by either arrow 29 or arrow 30. The direction of the initial deflection of armature 15 is dependent upon the initial direction of flow of the magnetic flux through armature 15. The direction of magnetic flux flow is dependent on whether the alternating current one half cycle is positive or is negative within the coil. It is seen that the initial deflection by the armature is determined by the initial direction of the flow of flux through the armature. The following half cycle of alternating current causes the flux flow to reverse direction and thus causes displacement of armature 15 in the opposite direction. Portion 48 of armature 15 in the vicinity of permanent magnet 16 has a polarity opposite the polarity of portion 49 of armature 15 in the vicinity of permanent magnet 17. The polarity in the two portions of the armature changes with each half cycle of alternating current since the coil inducing magnetic flux to flow through the armature is periodically reversed by the alternating current applied to the coil of a source (not shown). Armature 15 is fabricated from any suitable metal such as silicon steel.

Permanent magnet 16 has two pole faces 31 and 32 that are substantially parallel to the major plane of armature 15. The distance that separates the pole faces is a factor in determining the r.p.m. output of shaft 18 since armature 15 is displaced through a greater or lesser arc depending on the width of the gap between the pole faces. Assuming current flow in coil 10 is such that portion 48 of armature 15 that lies in the gap between pole faces 31 and 32 has a north polarity, armature 15 will be displaced in the direction of arrow 29, that is, toward the south pole face 32 of permanent magnet 16. The displacement is in accordance with the known principle that unlike polarities attract each other. Since pole face 31 has a north polarity and since armature 15 has a north polarity at portion 48 of the armature, the displacement of armature 15 toward pole face 32 is reinforced in accordance with the known principle that like polarities repel each other.

As disclosed hereinbefore permanent magnet 17 is secured to flange 13 and is separated from permanent magnet 16 by coil 10 and flanges 12 and 13. As disclosed before aperture 14 extends through permanent magnet 17. Pole faces 33 and 34 are formed on the magnet as shown in FIGURE 4. Pole face 33 has a north polarity whereas pole face 34 has a south polarity. Assuming that current flow in coil 10 is such that portion 48 of armature 15 that lies in the gap between pole faces 31 and 32 has a north polarity, the portion of the armature that lies in the gap between pole faces 33 and 34 of magnet 17 will have a south polarity, it is seen that armature 15 will be displaced in the direction of arrow 29 in accordance with the principles discussed hereinbefore. After the passage of a predetermined interval of time, that is, one half cycle of alternating current, the magnetic flux flow of coil 10 will reverse itself since as stated before the energizing current of coil 10 is an alternating current. Armature 15 will have polarities at portions 48 and at portion 49 reversed as a result of the reversal in direction of flux flow of coil 10. Thereafter, the portion of the armature in the vicinity of magnet 16 will be a south polarity whereas the portion of the armature in the vicinity of magnet 17 will be a north polarity. Under these conditions armature 15 will be displaced in the direction of arrow 30 in accordance with the principles discussed hereinbefore.

The armature will oscillate about the longitudinal axis of shaft 18 as a result of the cyclic change in flux flow through armature 15. The speed of oscillation of armature 15 about the longitudinal axis of the shaft is directly proportional to the frequency of the alternating current applied to coil 10.

As disclosed hereinbefore armature 15 is coupled to shaft 18 by means of one-way clutch 19. One-way clutch 19 is designed to be free to rotate in the counter-clockwise direction about shaft 18, and is designed to lock with shaft 18 when the one-way clutch is displaced in the clockwise direction. Shaft 18 is locked to one-way clutch 19 when the shaft is displaced in the counter-clockwise direction and the shaft is free to rotate within the one-way clutch when displaced the shaft is rotated in the clockwise direction. Thus, it is seen that when armature 15 coupled to shaft 18 through one-way clutch 19 is displaced in the direction of arrow 29, said one-way clutch becomes locked to shaft 10 in a manner to be disclosed hereinafter thus displacing shaft 18 through an arc proportional to the displacement of armature 15. Thereafter when armature 15 is displaced in the reverse direction, that is in the direction of arrow 30, clutch 19 being free running in the counter-clockwise direction, the armature and the clutch are displaced counter-clockwise without displacing shaft 18 in the counter-clockwise direction. When armature 15 is displaced in the direction of arrow 29, clutch 19 is displaced in the clockwise direction and thus becomes locked to shaft 18 displacing the shaft in the clockwise direction in proportion to the displacement of armature 15. It is seen that this cycle is continuous for as long as alternating current is applied to coil 10.

A second one-way clutch 20 fabricated similarly to one-way clutch 19 and couples mounting frame 21 to rotatable shaft 18. One-way clutch 20 like clutch 19 is free running with respect to shaft 18 when displaced in the counter clockwise direction and is locked to shaft 18 when displaced in the clockwise direction. Shaft 18 locks with one-way clutch 20 if the shaft is displaced in the counter clockwise direction. One-way clutch 20 aids in maintaining shaft 18 in a predetermined position and will prevent displacement of shaft 18 in the counter clockwise direction when one-way clutch 19 is displaced by armature 15 in the counter clockwise direction. One-way clutch 20 permits shaft 18 to be displaced in the clockwise direction by one-way clutch 19 when said clutch is displaced clockwise by armature 15 moving in the direction of arrow 29.

The r.p.m. of shaft 18 can be controlled several different ways among which are: varying the gap between the pole faces of permanent magnet 16; varying the width of armature 15; and varying the length of armature 15. Any one of the three variations have a direct effect on the angle of displacement to which shaft 18 is subjected during a one-half cycle of alternating current.

One-way clutch 19 of the present invention is of the type whereby shaft 18 is engaged with ring 35 when rotatable shaft 18 is displaced in the counter clockwise direction. Ring 35 is securely coupled to armature 15 by any suitable means such as retaining cap 50. Retaining cap 50 of the clutch and armature 15 could be fabricated from a unitary strip of suitable metal, or coupled together by any suitable means. When one-way clutch 19 is displaced in the clockwise direction, shaft 18 engages ring 35 due to the presence of the coefficient of friction that exists between the portion of the surface of shaft 18 that engages a first portion of roller bearing 38, and due to the presence of the coefficient of friction that exists between a second portion of roller bearing 38 and a portion of the surface of ring 35 that engages a second portion of roller bearing 38. Ring 35, roller bearings 38 and shaft 18 are fabricated from a suitable steel of desired hardness such that wear particles of steel that might occur cannot subsequently become magnetized thereby adhering to either the ring, the roller bearings or the shaft thereby retard the accurate engaging or disengaging qualities of one-way clutch 19. If shaft 18 is chromium plated, no lubricant is needed between the shaft and the roller bearings; however, if said shaft is not chromium plated, a suitable lubricant should be utilized between shaft 18 and roller bearings 38 to protect the bearings and the shaft.

Figure 5:
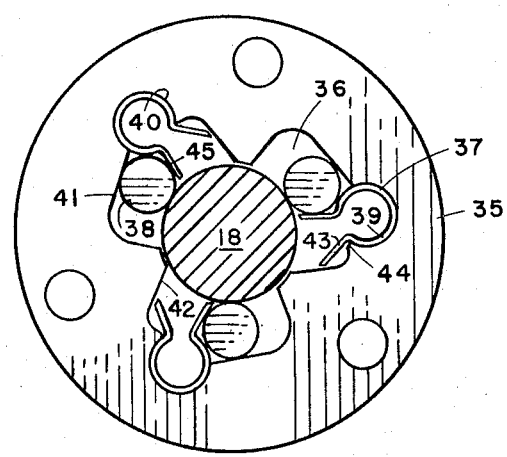
FIGURE 5 is an enlarged front view illustrating in detail the novel one-way clutch.

Shaft 18 is cylindrical in shape. The recess portion 36 of ring 35 used to seat roller bearings 38 and through which shaft 18 projects at a right angle thereto has a novel configuration utilized to seat an odd number of roller bearing and at least one resilient spring 37 associated with each bearing. Each of the springs is essentially V-shaped with the exception of the crotch portion 39 thereof which is substantially three-quarter circular shaped so as to interfit with a substantially three-quarter circular first portion 40 of recess portion 36 of ring 35. The springs 37 serve to bias the respective rollers into engagement with shaft 18 and with the corresponding recess faces 41. As shown in FIGURE 5 rotation of ring 35 in the clockwise direction provides a means whereby a spring 37 forces roller 38 into engagement with the recess faces 41 so that the roller bearings serve to drive shaft 18 and pinion 24 and cam means 46 in the clockwise direction. However, as noted hereinbefore, ring 35 rotates independent of shaft 18 in the counter clockwise direction.

Second portion 42 is substantially parallel to a line drawn to bisect a front view of substantially V-shaped spring 37. Leg 43 of substantially V-shaped spring 37 abuts second portion 42. Second portion 42 maintains leg 43 at a predetermined position with respect to the three-quarter circular crotch portion 39 of spring 37. A flange 44 of the recess portion 36 is formed at the point where the first portion 40 and the second portion 42 join so as to provide a pivot point for spring 37 when said spring is compressed or expanded due to the displacement of bearing 38.

A leg 45 of substantially V-shaped spring adjacent roller bearing 38 urges the bearing to a predetermined position with respect to shaft 18 and recess face 41 such that bearing 38 is required to traverse a distance of less than four minutes of a degree to either allow shaft 18 to be free-running or to lock shaft 18 to ring 35. Resilient springs 39 are fabricated of beryllium copper so that the springs cannot be magnetized. If the springs were allowed to become magnetized, the springs would accumulate metallic particles such accumulation either causing bearings 38 to skid before engaging shaft 18 or to remain engaged with shaft 18 a longer period of time than can be tolerated.

The three-quarter circular first portion 40 of recess portion 36 has a segment terminating in a channel or recess face 41 that provides a seat for roller bearing 38. Recess face 41 possesses an engagement angle that is progressively larger with respect to a cord of shaft 18 drawn between the point on said shaft where said shaft is free running of the bearing and the point thereon where said shaft is engaged with ring 35 through the bearing. The engagement angle is equal to the angle of the cord of said shaft plus eight to ten degrees. It has been found that if the engagement angle exceeds the angle of the cord of shaft 18 plus ten degrees, the shaft has a tendency to skid before engaging thus altering the locking accuracy of the clutch. If the engagement angle is less than the angle of the cord of shaft 18 plus eight degrees, roller bearing 38 will not disengage properly therefore altering the accuracy of disengagement of the clutch with the shaft. The length of recess face 41 is approximately one and one-half times the diameter of roller bearing 38 so as to provide a face of ample length to compensate for wear that might occur of either the bearing or the recess face or both.

An odd number of roller bearings 38 and associated springs 37 are utilized so that shaft 18 is self-centering thus eliminating excess bearing wear caused by shaft oscillation, and the tendency of the shaft to skid on the bearings if the shaft is not properly centered between the bearings. It was found that if an even number of bearings are utilized, a plane drawn so as to pass through the longitudinal axis of the shaft would pass through the centers of two of the rollers bearings. If shaft 18 is displaced toward a first one of the bearings, the second bearing opposite and having its center lying in a plane passing through the longitudinal axis of the shaft and the center of a second ball bearing would not be urged downwardly but urged counter clockwise by spring 37 due to the inherent contour of the spring and the recess face. The load of the shaft is shifted to the remaining bearings thus appreciably increasing the wear of the bearings so loaded. Since no bearing support is available to the shaft at the point of separation between the shaft and the first bearing, the shaft is free to oscillate in this unsupported area, the resulting oscillation having deleterious effect on the accuracy of operation the one-way clutch. However, if at least three roller bearings or any other higher odd number of bearings are utilized, no two bearings will lie in a plane passing through the longitudinal axis of the shaft and the centers of any two roller bearings. If shaft 18 is displaced toward a roller bearing 38 and therefore away from the two other roller bearings 38, leg 45 of spring 37 urges roller bearing 38 in a counter clockwise direction thus maintaining roller bearing 38 in such a position with respect to recess face 41 and shaft 18 that the shaft cannot oscillate. It is seen the load on the bearings remains equally distributed therebetween, thus neither the engaging or disengaging characteristics of one-way clutch 19 are effected nor do the bearings experience excessive wear.

Figure 6:
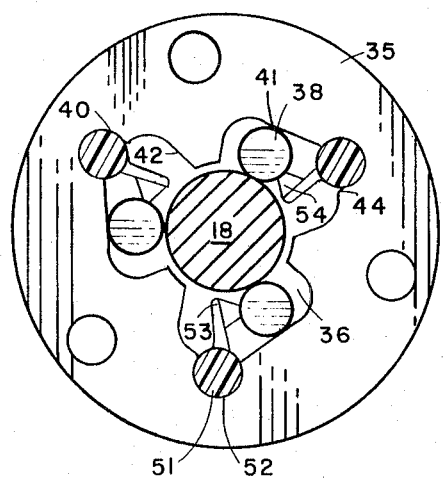
FIGURE 6 is a top view of another embodiment of the one-way clutch.

FIGURE 6 is a modification of the resilient spring means of the one-way clutch of FIGURES 2 and 5. In this embodiment the plurality of metallic springs 37 as illustrated in FIGURE 5 are replaced by a plurality of non-resilient bias means such as resilient plastic spring 51. The plastic spring has a circular portion 52 that interfits with the first portion 40 of ring 35. Extending from circular portion 52 toward shaft 18 is arm 53 and projecting from arm 53 is flange 54. Flange 54 urges roller bearing 38 to a predetermined position with respect to shaft 18 and recess face 41 such that bearing 38 is required to traverse a distance of less than four minutes of a degree to either allow shaft 18 to be free-running or to lock shaft 18 to ring 35.

Figure 7:
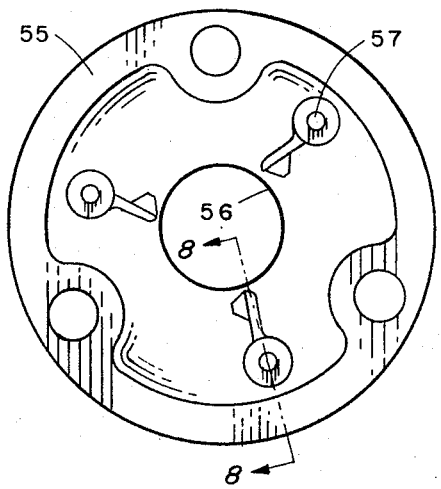
FIGURE 7 is a top view of the resilient bias means of FIGURE 6 and associated securing plate to which the resilient bias means is attached.
Figure 8:
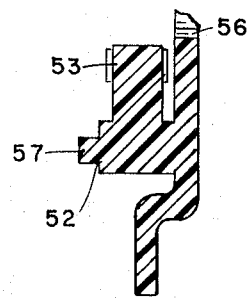
FIGURE 8 is a cross sectional view of the resilient bias means and associated securing plate taken across the line 8—8 of FIGURE 7.

FIGURE 8 illustrates a plastic retaining cap 55 that have springs 51 molded as an integral part thereof. It is seen that springs 51 are equally spaced about shaft as are resilient metallic springs 37 of FIGURE 5. Retaining cap 55 has an aperture 56 at its center through which shaft 18 projects. Node 57 projects from each of the circular portions 52 at the longitudinal axis thereof. Nodes 57 interfit with apertures (not shown) in retaining cap 50. Nodes are flattened over cap 53 in the same manner as a rivet is to provide a means to hold the cap in a predetermined position with respect to ring 35 and cap 55. FIGURE 8 shows a cross sectional view of the nonmetallic resilient bias means and associated securing cap taken across the line 8—8 of FIGURE 7.

Figure 9:
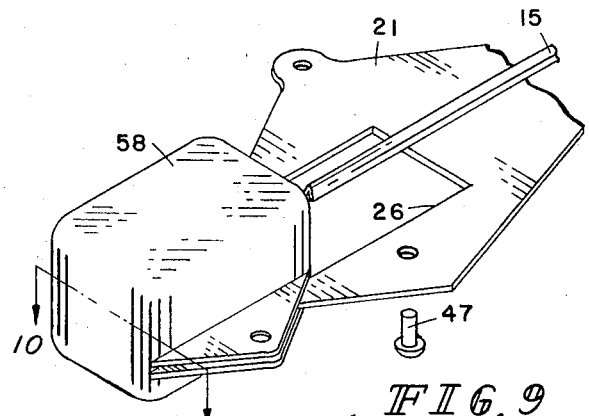
FIGURE 9 is a perspective view showing the coil encapsulated in a noise damping material.

The embodiment of FIGURE 9 shows coil 10 encapsulated in a material such as plastic, which material dampens the noise emitted by the operation of armature 15.

Figure 10:
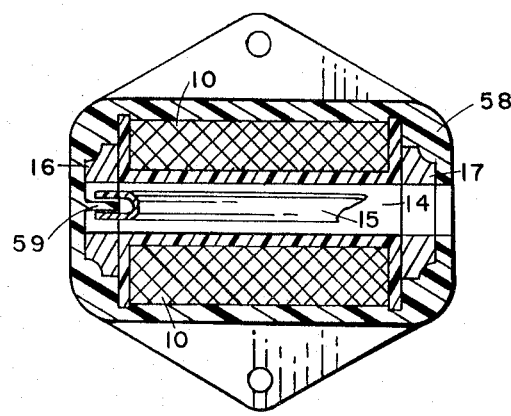
FIGURE 10 is a cross sectional view taken across the line 10—10 of FIGURE 9.

FIGURE 10 is a cross sectional view taken across the line of 10—10 of FIGURE 9. Armature 15 is shown placed within coil 10 in aperture 14. A node 59 moulded as an integral part of encapsulating material 58 fits within slot 22 of the armature. Node 59 is not movable with armature but rather is rigid within slot 22. The purpose of node 59 is to prevent armature 15 from hitting the pole faces of permanent magnet 16 thus preventing an audible noise. Since the node is fabricated of a nonmetallic material, when the face of slot 22 strikes the node no audible noise is produced thereby.

Figure 11:
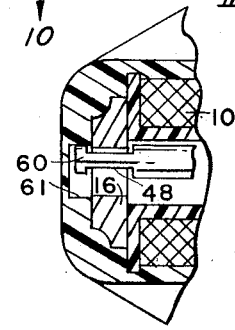
FIGURE 11 is a cross sectional view taken across the line 10—10 of FIGURE 9 illustrating an embodiment of the armature.

FIGURE 11 is a fragmentary cross sectional view taken across the line of 10—10 of FIGURE 9. The modification is in portion 48 of armature 15. Portion 48 is recessed in armature 15, the recess terminating in flange 60. Flange 60 oscillates within notch 61 in accordance with the principles discussed heerinbefore. The flange portion 60 of armature 15 abuts noise damping material 58 prior to the recess portion 48 of armature 15 coming into close proximity of magnet 16 thus effectively preventing the armature from striking the magnet thus producing substantially noiseless operation.

Figure 12:
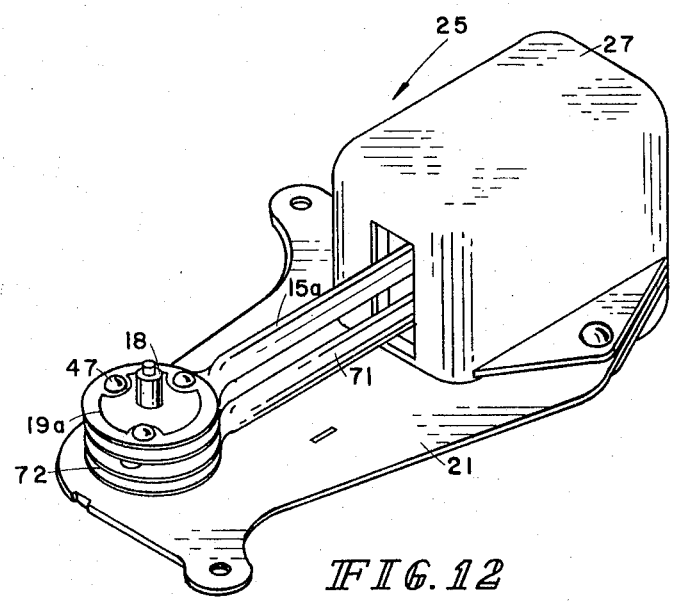
FIGURE 12 is a perspective view illustrating a constant running vibratory motor.
Figure 13:
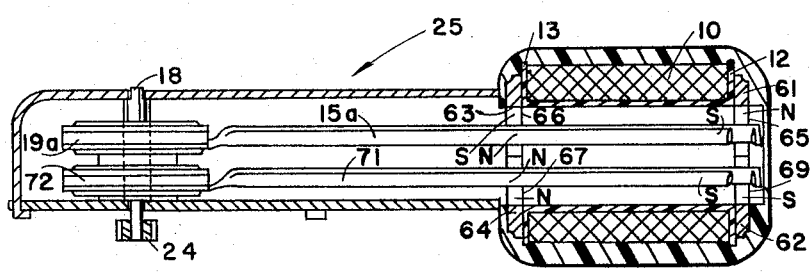
FIGURE 13 is a sectional view of the constant running vibratory motor.
Figure 14:
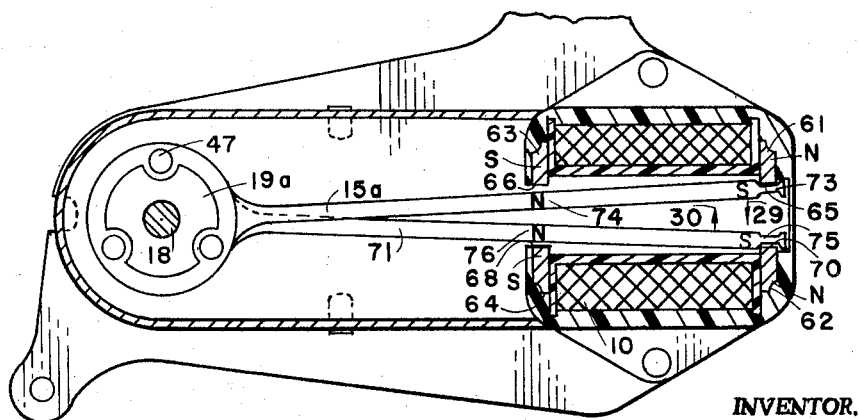
FIGURE 14 is a top sectional view of the constant running vibratory motor.

FIGURES 12, 13 and 14 are a modification of the vibratory of FIGURES 1–4 and 10–11 are illustrated. In this embodiment, instead of having one armature as shown in FIGURE 2, the vibratory motor is equipped with two armatures that cooperate to actuate rotatable shaft 18 unidirectionally with a constant rotary motion.

Coil 10 is wound about spindle 11 fabricated of plastic or other suitable material. Spindle 11 has a first flange 12 and a second flange 13 as disclosed hereinbefore. The spindle and associated flanges serve to predeterminately locate the coil. An aperture 14 traverses longitudinally the axis of the spindle and projects through the respective flanges of the spindle. Coupled by any suitable means to flange 12 are two U-shaped permanent magnets 61 and 62. Coupled to flange 13 are two U-shaped permanent magnets 63 and 64. FIGURE 13 illustrates that the respective legs of the magnets 61 and 62 and the respective legs of the magnets 63 and 64 are abutting on a line determined by a horizontal plane passing the longitudinal axis of coil 10. As shown in FIGURES 13 and 14 the permanent magnets are so located to allow aperture 14 to extend through the aperture formed by the magnets. A first pole of each magnet is marked "N" to denote the north pole of each respective magnet and a second pole is marked "S" to denote the south pole of each respective magnet. Each of the respective permanent magnets produces a steady magnet flux flow.

A first armature 15a extends the length of the upper half of aperture 14 and thereafter projects beyond the permanent magnets 61 and 63 predetermined lengths. One extremity of armature 15a is coupled to shaft 18, a pivot point about which the armature oscillates. The armature is coupled to shaft 18 by means of one-way clutch 19a. The operation of the armature within coil 10 energized by an alternating current is the same as described hereinbefore in conjunction with FIGURE 2.

A second armature 71 extends the length of the lower half of aperture 14 and thereafter projects beyond permanent magnets 62 and 64. Armature 71 has an extremity coupled to one-way clutch 72 which clutch in turn is coupled to shaft 18. The operation and construction of clutch 72 is the same as clutch 19a, and the operation and construction of armature 71 is similar to that of armature 15a.

It is seen that an electrical alternating current passing through coil 10 and about armature 15a and armature 71 causes an alternating or pulsating magnetic flux to flow through a path defined by the respective armatures. The pulsating magnetic flux causes a first polarity to exist in a first extremity of the respective armatures and a second polarity extremity of the armatures. The polarities that exist in the two extremities of the respective armatures interacting with the steady magnetic fluxes developed by he pole faces of the permanent magnets causing the respective armatures to be displaced in a first-second or second-first horizontal direction as illustrated by arrow 29 and arrow 30. The directions of the initial deflection of armatures 15a and 71 are dependent upon the initial direction of flow of the pulsating magnetic flux through armature 15a and through armature 71. The direction of pulsating magnetic flux flow is dependent on whether the alternating current one-half cycle is positive or is negative within coil 10. The direction of flux flow is reversed each one-half cycle. Recessed portion 73 of armature 15a in the vicinity of permanent magnet 61 has a polarity opposite to the polarity of portion 74 of armature 15a in the vicinity of permanent magnet 63. Recessed portion 75 of armature 71 in the vicinity of permanent magnet 62 has a polarity opposite that of the polarity of portion 76 of armature 71 in the vicinity of permanent magnet 64. The armatures are constructed of any suitable metal such as silicon steel.

Permanent magnet 61, as does permanent magnets 62, 63 and 64, has two pole faces. Each of the pole faces are substantially parallel to the major plane of the armatures. Pole face 65 of magnet 61 has a north polarity whereas the pole face (not shown) of magnet 61 opposite pole face 65 is of a south polarity. Assuming pulsating magnetic flux flow developed by coil 10 is such that recess 73 of armature 15a has a south polarity the portion that lies between the south pole face 66 of magnet 63 and the north pole face (not shown) of magnet 63 has a north polarity, it is seen that armature 15a will be displaced in the direction of arrow 30 in accordance with principles discussed hereinbefore. After the passage of a predetermined interval of time as determined by the time length of one-half cycle of alternating current, the flux developed by coil 10 will reverse itself, as a result of the reversal in of current flow within the coil. The recess portion of the armature in the vicinity of magnet 61 will be a north polarity whereas the portion of the armature in the vicinity of magnet 63 will be a south polarity. Under these conditions armature 15a will be deflected in the direction of arrow 29.

It is seen that the polarity of the recess portion 75 of armature 71 will be the same as the polarity of recess portion 73 of armature 15a and hence portion 76 of armature 71 will have the same polarity as portion 74 of armature 15a. Assuming current flow in coil 10 is such that recess portion 75 of armature 71 has a south polarity, it is seen that armature 71 is deflected toward north pole face 70 of magnet 62 in the direction of arrow 29 and away from the south pole face 69 of magnet 62. If recess portion 75 has a south polarity, portion 76 of armature 71 has a north polarity and hence portion 76 will be deflected toward the south pole face 68 of magnet 64 and away from the north pole face 67 of magnet 64.

The pole face 69 of magnet 62 which underlies pole face 65 of magnet 61 is opposite in polarity. This is true with regard to the pole faces of magnets 67 and 64 that underlie pole faces of magnets 61 and 65. As a result thereof, armature 15a moves in a direction opposite to that of armature 71. It is seen during one-half cycle of alternating current, armature 15a will move in the direction of arrow 30 whereas during same one-half cycle of alternating current armature 71 moves in the direction of arrow 29.

The construction of one-way clutch 19a and of one-way clutch 72 is substantially the same as one-way clutch 19. One-way clutch 19a and one-way clutch 72 are free to rotate in the counter-clockwise direction about shaft 18, and each is designed to lock with shaft 18 when the clutch is displaced in the clockwise direction. One-way clutch 19a and one-way clutch 72 are coupled respectively to shaft 18 and respectively to armature 15a and armature 71 in the manner disclosed in conjunction with the description of the structural couplings between shaft 18 and clutch 19 and armature 15.

It is seen that the vibratory motor of FIGURES 12, 13 and 14 is continuous running. Shaft 18 will be unidirectionally rotated during the first one-half cycle of alternating current by displacement of the first armature in a first direction and unidirectionally rotated during the second one-half cycle of alternating current by displacement of the second armature in the first direction. No unidirectional rotation of shaft 18 takes place when either armature is displaced in the second direction since as disclosed hereinbefore the clutches are free running in the second direction with respect to the shaft.

It is seen that by reversing the positions of each clutch the clutch will be effective for driving shaft 18 in the reverse direction.

While the invention is illustrated and described in its preferred embodiments, it will be understood that modification and variations may be effected without departing from the scope of the novel concepts of this invention and as set forth in the appended claims.

Having thus described my invention, I claim:

1. A slow speed electric motor comprising: an apertured coil means energized by pulsating current so as to provide a source of pulsating magnetic flux, permanent magnet means juxtaposed said coil means so as to provide a source of steady magnetic flux, an armature having a free end projecting through said aperture of said coil means magnetically coupling said free end of said armature to said coil means and to said permanent magnet means, interaction of said pulsating magnetic flux of said coil means and of said steady magnetic flux of said permanent magnet means causing said free end of said armature to vibrate within said aperture of said coil means, one-way clutch means connected to an extremity of said armature opposite said free end thereof, a shaft coupled to said clutch means, said clutch means translating said vibratory motion of said armature to unidirectional motion thereby rotating said shaft in a predetermined direction.

2. A slow speed electric motor comprising: an apertured mounting means, an apertured coil means carried by said mounting means and energized by pulsating current so as to provide a source of pulsating magnetic flux, permanent magnet means juxtaposed said coil means so as to provide a source of steady magnetic flux, an armature having a free end projecting through said aperture of said coil means magnetically coupling said free end of said armature to said coil means and to said permanent magnet means, interaction of said pulsating magnetic flux of said coil means and of said steady magnetic flux of said permanent magnet means causing said free end of said armature to vibrate within said aperture of said coil means, a first one-way clutch means connected to an extremity of said armature opposite said free end thereof, a second one-way clutch means carried by and overlaying said aperture of said mounting means, a shaft coupled to said first and second clutches and projecting through said aperture of said mounting means, said first clutch means translating said vibratory motion of said armature to unidirectional motion thereby rotating said shaft in a first direction, said second clutch means preventing rotation of said shaft in a second direction.

3. A slow speed electric motor comprising: an apertured mounting means, an apertured coil means carried by said mounting means and energized by pulsating current so as to provide a source of pulsating magnetic flux, permanent magnet means juxtaposed said coil means so as to provide a source of steady magnetic flux, an armature having a free end projecting through said aperture of said coil means magnetically coupling said free end of said armature to said coil means and to said permanent magnet means, interaction of said pulsating magnetic flux of said coil means and of said steady magnetic flux of said permanent magnet means causing said free end of said armature to vibrate with lateral vibratory motion within said aperture of said coil means, a first one-way clutch means connected to an extremity of said armature opposite said free end thereof, a second one-way clutch means carried by and overlaying said aperture of said mounting means, a shaft coupled to said first and second clutches, and projecting through said aperture of said mounting means, said first clutch means translating said lateral vibratory motion of said armature to unidirectional motion thereby rotating said shaft in a first direction, said second clutch means preventing rotation of said shaft in a second direction.

4. A slow speed electric motor comprising: an apertured coil means energized by pulsating current so as to provide a source of pulsating magnetic flux, apertured permanent magnet means adjacent said coil means so as to provide a source of steady magnetic flux, an armature having a free end projecting through said aperture of said coil means and said apertures of said permanent magnet means magnetically coupling said free end of said armature to said coil means and to said permanent magnet means, interaction of said pulsating magnetic flux of said coil means and of said steady magnetic flux of said permanent magnet means causing said free end of said armature to vibrate with lateral vibratory motion within said aperture of said coil means and said apertures of said permanent magnet means, one-way clutch means connected to an extremity of said armature opposite said free end thereof, a shaft coupled to said clutch means, said clutch means translating said lateral vibratory motion of said armature to unidirectional motion thereby rotating said shaft in a predetermined direction.

5. A slow speed electric motor comprising: a longitudinal by apertured coil means energized by pulsating current so as to provide a source of pulsating magnetic flux, axially apertured permanent magnet means abutting each extremity of said coil means so as to provide a source of steady magnetic flux, an armature having a free end projecting through said aperture of said coil means and said apertures of said permanent magnet means magnetically coupling said free end of said armature to said coil means and to said permanent magnet means, interaction of said pulsating magnetic flux of said coil means and of said steady magnetic flux of said permanent magnet means causing said free end of said armature to vibrate with lateral vibratory motion within said aperture of said coil means and said apertures of said permanent magnet means, one-way clutch means connected to an extremity of said armature opposite said free end thereof, a shaft coupled to said clutch means, said clutch means translating said lateral vibratory motion of said armature to unidirectional motion thereby rotating said shaft in a predetermined direction.

6. A slow speed electric motor comprising: mounting means, a longitudinally apertured coil means carried by said mounting means and energized by pulsating current so as to provide a source of pulsating magnetic flux, axially apertured permanent magnet means abutting each extremity of said coil means so as to provide a source of steady magnetic flux, an armature having a free end projecting through said aperture of said coil means and said apertures of said permanent magnet means magnetically coupling said free end of said armature to said coil means and to said permanent magnet means, interaction of said pulsating magnetic flux of said coil means and of said steady magnetic flux of said permanent magnet means causing said free end of said armature to vibrate with lateral vibratory motion within said aperture of said coil means and said apertures of said permanent magnet means, a first one-way clutch means connected to an extremity of said armature opposite said free end thereof, a second one-way clutch means carried by said mounting means, a shaft coupled to said first and second clutches, said first clutch means translating said lateral vibratory motion of said armature to unidirectional motion thereby rotating said shaft in a first direction, said second clutch means preventing rotation of said shaft in a second direction.

7. A slow speed electric motor comprising: an apertured mounting means, a longitudinally apertured coil means including a resilient casing carried by said mounting means and energized by pulsating current so as to provide a source of pulsating magnetic flux, axially apertured permanent magnet means abutting each extremity of said coil means so as to provide a source of steady magnetic flux, an armature having a free end projecting through said aperture of said coil means and said apertures of said permanent magnet means magnetically coupling said free end of said armature to said coil means and to said permanent magnet means, interaction of said pulsating magnetic flux of said coil means and of said steady magnetic flux of said permanent magnet means causing said free end of said armature to vibrate with lateral vibratory motion within said aperture of said coil means and said apertures of said permanent magnet means, said resilient casing including means for preventing said free end of said armature from engaging with said magnet means, a first one-way clutch means connected to an extremity of said armature opposite said free end thereof, a second one-way clutch means carried by and overlaying said aperture of said mounting means, a shaft coupled to said first and second clutches and projecting through said aperture of said mounting means, said first clutch means translating said lateral vibratory motion of said armature to unidirectional motion thereby rotating said shaft in a first direction, said second clutch means preventing rotation of said shaft in a second direction.

8. A slow speed electric motor comprising: an apertured mounting means, a longitudinally apertured coil means carried by said mounting means and energized by pulsating current so as to provide a source of pulsating magnetic flux, axially apertured permanent magnet means abutting each extremity of said coil means so as to provide a source of steady magnetic flux, an armature having a free end projecting through said aperture of said coil means and said apertures of said permanent magnet means magnetically coupling said free end of said armature to said coil means and to said permanent magnet means, interaction of said pulsating magnetic flux of said coil means and of said steady magnetic flux of said permanent magnet means causing said free end of said armature to vibrate with lateral vibratory motion within said aperture of said coil means and said apertures of said permanent magnet means, a first one-way clutch means connected to an extremity of said armature opposite said free end thereof, a second one-way clutch means carried by and overlaying said aperture of said mounting means, a shaft coupled to said first and second clutches and projecting through said aperture of said mounting means, said first clutch means translating said lateral vibratory motion of said armature to unidirectional motion thereby rotating said shaft in a first direction, said second clutch means preventing rotation of said shaft in a second direction, and biasing means carried by said mounting means for biasing said armature to a position substantially equidistant from the side walls of said aperture of said coil means when said armature is at rest thereby substantially preventing magnetization of said armature by said permanent magnet means.

9. A slow speed electric motor comprising: an apertured mounting means, a longitudinally apertured coil means carried by said mounting means and energized by pulsating current so as to provide a source of pulsating magnetic flux, axially apertured permanent magnet means abutting each extremity of said coil means so as to provide a source of steady magnetic flux, an armature including a free end projecting through said aperture of said coil means and said apertures of said permanent magnet means magnetically coupling said free end of said armature to said coil means and to said permanent magnet means, interaction of said pulsating magnetic flux of said coil means and of said steady magnetic flux of said permanent magnet means causing said free end of said armature to vibrate with lateral vibratory motion within said aperture of said coil means and said apertures of said permanent magnet means, a first one-way clutch means connected to an extremity of said armature opposite said free end thereof, a second one-way clutch means carried by and overlaying said aperture of said mounting means, a shaft coupled to said first and second clutches and projecting through said aperture of said mounting means, said first clutch means translating said lateral vibratory motion of said armature to unidirectional motion thereby rotating said shaft in a first direction, said second clutch means preventing rotation of said shaft in a second direction, and spring biasing means carried by said mounting means and coupled to said free end of said armature for spring biasing said armature to a position substantially equidistant from the side walls of said aperture of said coil means when said armature is at rest thereby substantially preventing magnetization of said armature by said permanent magnet means.

10. A slow speed electric motor comprising: an apertured mounting means, a longitudinally apertured coil means carried by said mounting means and energized by pulsating current so as to provide a source of pulsating magnetic flux, axially apertured permanent magnet means abutting each extremity of said coil means so as to provide a source of steady magnetic flux, an armature including a free end having a substantially U-shaped cross section projecting through said aperture of said coil means and said apertures of said permanent magnet means magnetically coupling said free end of said armature to said coil means and to said permanent magnet means, interaction of said pulsating magnetic flux of said coil means and of said steady magnetic flux of said permanent magnet means causing said free end of said armature to vibrate with lateral vibratory motion within said aperture of said coil means and said apertures of said permanent magnet means, a first one-way clutch means connected to an extremity of said armature opposite said free end thereof, a second one-way cluch means carried by and overlaying said aperture of said mounting means, a shaft coupled to said first and second clutches and projecting through said aperture of said mounting means, said first clutch means translating said lateral vibratory motion of said armature to unidirectional motion thereby rotating said shaft in a first direction, said second clutch means preventing rotation of said shaft in a second direction, and leaf spring biasing means carried by said mounting means, the free end of said leaf spring means interfitting with said U-shaped cross section of said armature so as bias said armature to a position substantially equidistant from the side walls of said aperture of said coil means when said armature is at rest thereby substantially preventing magnetization of said armature by said permanent magnet means.

11. A slow speed electric motor comprising: an apertured mounting means, a longitudinally apertured coil means including a resilient casing carried by said mounting means and energized by pulsating current so as to provide a source of pulsating magnetic flux, axially apertured permanent magnet means abutting each extremity of said coil means so as to provide a source of steady magnetic flux, an armature including a free end having a substantially U-shaped cross section projecting through said aperture of said coil means and said apertures of said permanent magnet means magnetically coupling said free end of said armature to said coil means and to said permanent magnet means, said free end of said armature having recessed portions at the extremity thereof permitting greater displacement of said free end and providing a path for said pulsating magnetic flux, interaction of said pulsating magnetic flux of said coil means and of said steady magnetic flux of said permanent magnet means causing said free end of said armature to vibrate with lateral vibratory motion within said aperture of said coil means and said apertures of said permanent magnet means, said resilient casing including means for preventing said free end of said armature from engaging with said magnet means, a first one-way clutch means connected to an extremity of said armature opposite said free end thereof, a second one-way clutch means carried by and overlaying said aperture of said mounting means, a shaft coupled to said first and second clutches and projecting through said aperture of said mounting means, said first clutch means translating said lateral vibratory motion of said armature to unidirectional motion thereby rotating said shaft in a first direction, said second clutch means preventing rotation of said shaft in a second direction, and leaf spring biasing means carried by said mounting means, the free end of said leaf spring means interfitting with said U-shaped cross section of said armature so as to bias said armature to a position substantially equidistant from the side walls of said aperture of said coil means when said armature is at rest thereby substantially preventing magnetization of said armature by said permanent magnet means.

12. A slow, constant speed electric motor comprising: an apertured coil means energized by pulsating current so as to provide a source of pulsating magnetic flux, permanent magnet means juxtaposed said coil means so as to provide a source of steady magnetic flux, at least two armatures having their free ends projecting through said aperture of said coil means magnetically coupling said free ends of said armatures to said coil means and to said permanent magnet means, interaction of said pulsating magnetic flux of said coil means and of said steady magnetic flux of said permanent magnet means causing said free ends of said armatures to vibrate within said aperture of said coil means, a first one-way clutch means connected to an extremity of one of said armatures opposite said free end thereof, a second one-way clutch means connected to an extremity of the other armature opposite said free end thereof, a shaft coupled to said first and second clutch means, said first and said second clutch means translating said vibratory motion of said armatures to unidirectional motion thereby rotating said shaft in a first direction at a constant speed and preventing rotation of said shaft in a second direction.

13. A slow, constant speed electric motor comprising: an apertured coil means energized by pulsating current so as to provide a source of pulsating magnetic flux, substantially O-shaped permanent magnet means abutting each extremity of said coil means so as to provide a source of steady magnetic flux, each of said permanent magnet means including two substantially U-shaped magnets having pole faces in spaced parallel relationship, said two U-shaped magnets joined to form said substantially O-shaped permanent magnet means having abutting north-south poles and poles of opposite polarity in spaced parallel relationship, at least two armatures having their free ends projecting through said aperture of said coil means and said apertures of said permanent magnet means magnetically coupling said free end of said armatures to said coil means and to said permanent magnet means, interaction of said pulsating magnetic flux of said coil means and of said steady magnetic flux of said permanent magnet means causing said free ends of said armatures to vibrate with lateral vibratory motion within said aperture of said coil means and said apertures of said permanent magnet means, a first one-way clutch means connected to an extremity of one of said armatures opposite said free end thereof, a second one-way clutch means connected to an extremity of the other armature opposite said free end thereof, a shaft coupled to said first and second clutch means, said first and said second clutch means translating said lateral vibratory motion of said armatures to unidirectional motion thereby rotating said shaft in a first direction at a constant speed and preventing rotation of said shaft in a second direction.

14. A slow, constant speed electric motor comprising: a longitudinally apertured coil means energized by pulsating current so as to provide a source of pulsating magnetic flux, substantially O-shaped permanent magnet means abutting each extremity of said coil means so as to provide a source of steady magnetic flux, each of said permanent magnet means including two substantially U-shaped magnets having pole faces in spaced parallel relationship, said two U-shaped magnets joined to form said substantially O-shaped permanent magnet means having abutting north-south poles and poles of opposite polarity in spaced parallel relationship, at least two armatures having their free ends projecting through said aperture of said coil means and said apertures of said permanent magnet means, said free ends of said armatures in spaced relationship so as to be biased in opposite directions by said O-shaped permanent magnet means thereby magnetically coupling said free ends of said armatures to said coil means and to said permanent magnet means, interaction of said pulsating magnetic flux of said coil means and of said steady magnetic flux of said permanent magnet means causing said free ends of said armatures to vibrate with lateral vibratory motion within said aperture of said coil means and said apertures of said permanent magnet means, a first one-way clutch means connected to an extremity of one of said armatures opposite said free end thereof, a second one-way clutch means connected to an extremity of the other armature opposite said free end thereof, a shaft coupled to said first and second clutch means, said first and said second clutch means translating said lateral vibratory motion of said armatures to unidirectional motion thereby rotating said shaft in a first direction at a constant speed and preventing rotation of said shaft in a second direction.

15. A slow, constant speed electric motor comprising: a longitudinally apertured coil means including a resilient casing energized by pulsating current so as to provide a source of pulsating magnetic flux, substantially O-shaped permanent magnet means abutting each extremity of said coil means so as to provide a source of steady magnetic flux, each of said permanent magnet means including two substantially U-shaped magnets having pole faces in spaced parallel relationship, said two U-shaped magnets joined to form said substantially O-shaped permanent magnet means having abutting north-south poles and poles of opposite polarity in spaced parallel relationship, at least two armatures having their free ends projecting through said aperture of said coil means and said apertures of said permanent magnet means, said free ends of said armatures in spaced relationship as to be biased in opposite directions by said O-shaped permanent magnet means thereby magnetically coupling said free ends of said armatures to said coil means and to said permanent magnet means, said free ends of said armatures having recessed portions and providing a path for said magnetic flux, interaction of said pulsating magnetic flux of said coil means and of said steady magnetic flux of said permanent magnet means causing said free ends of said armatures to vibrate with lateral vibratory motion within said aperture of said coil means and said apertures of said permanent magnet means, said resilient casing including means for preventing said free ends of said armature from engaging with said O-shaped magnets, a first one-way clutch means connected to an extremity of one of said armatures opposite said free end thereof, a second one-way clutch means connected to an extremity of the other armature opposite said free end thereof, a shaft coupled to said first and second clutch means, said first and said second clutch means translating said lateral vibratory motion of said armatures to unidirectional motion thereby rotating said shaft in a first direction at a constant speed and preventing rotation of said shaft in a second direction.

16. A slow, constant speed electric motor comprising: a longitudinally apertured coil means including a resilient casing energized by pulsating current so as to provide a source of pulsating magnetic flux, substantially O-shaped permanent magnet means abutting each extremity of said coil means so as to provide a source of steady magnetic flux, each of said permanent magnet means including two substantially U-shaped magnets having pole faces in spaced parallel relationship, said two U-shaped magnets joined to form said substantially O-shaped permanent magnet means having abutting north-south poles and poles of opposite polarity in spaced parallel relationship, at least two armatures having their free ends projecting through said aperture of said coil means and said apertures of said permanent magnet means, said free ends of said armatures in spaced relationship so as to be biased in opposite directions by said O-shaped permanent magnet means thereby magnetically coupling said free ends of said armatures to said coil means and to said permanent magnet means, said free ends of said armatures having recessed portions at the extremity thereof permitting greater displacement of said free ends and providing a path for said magnetic flux, interaction of said pulsating magnetic flux of said coil means and of said steady magnetic flux of said permanent magnet means causing said free ends of said armatures to vibrate with lateral vibratory motion within said aperture of said coil means and said apertures of said permanent magnet means, said resilient casing including means for preventing said free ends of said armatures from engaging with said O-shaped magnet means, a first one-way clutch means connected to an extremity of one of said armatures opposite said free end thereof, a second one-way clutch means connected to an extremity of the other armature opposite said free end thereof, a shaft coupled to said first and second clutch means, said first and said second clutch means translating said lateral vibratory motion of said armature to unidirectional motion thereby rotating said shaft in a first direction at a constant speed and preventing rotation of said shaft in a second direction.

References Cited by the Examiner
UNITED STATES PATENTS

| | | | |
|---|---|---|---|
| 1,739,885 | 12/1929 | Zbinden | 310—37 X |
| 2,548,731 | 4/1951 | Lehde. | |
| 2,741,712 | 4/1956 | Lonnquist | 310—37 |
| 2,958,793 | 11/1960 | Lonnquist | 310—37 |
| 3,202,849 | 8/1965 | Neal | 310—37 |

MILTON O. HIRSHFIELD, *Primary Examiner.*

D. F. DUGGAN, *Assistant Examiner.*